United States Patent
Hong et al.

(10) Patent No.: US 10,505,876 B2
(45) Date of Patent: Dec. 10, 2019

(54) INSTANT COMMUNICATION METHOD AND SERVER

(71) Applicant: Alibaba Group Holding Limited, Grand Cayman (KY)

(72) Inventors: Zhu Hong, Fremont, CA (US); Hang Chen, Hangzhou (CN); Zhenhao Wu, Hangzhou (CN)

(73) Assignee: Dingtalk Holding (Cayman) Limited, Grand Cayman (KY)

( * ) Notice: Subject to any disclaimer, the term of this patent is extended or adjusted under 35 U.S.C. 154(b) by 284 days.

(21) Appl. No.: 15/153,662

(22) Filed: May 12, 2016

(65) Prior Publication Data
US 2016/0337284 A1    Nov. 17, 2016

(30) Foreign Application Priority Data
May 14, 2015  (CN) .......................... 2015 1 0245851

(51) Int. Cl.
*G06F 15/16*  (2006.01)
*H04L 12/58*  (2006.01)
*G10L 13/00*  (2006.01)

(52) U.S. Cl.
CPC .............. *H04L 51/10* (2013.01); *H04L 51/04* (2013.01); *G10L 13/00* (2013.01)

(58) Field of Classification Search
CPC ................................ H04L 51/10; H04L 51/04
USPC ........................................................ 709/206
See application file for complete search history.

(56) References Cited

U.S. PATENT DOCUMENTS

| 6,067,348 | A  | * | 5/2000  | Hibbeler ................. | H04M 3/42 |
|           |    |   |         |                           | 379/67.1 |
| 6,563,912 | B1 | * | 5/2003  | Dorfman ............... | H04L 51/066 |
|           |    |   |         |                           | 379/88.12 |
| 6,955,294 | B1 | * | 10/2005 | Seegar ................... | G06Q 20/04 |
|           |    |   |         |                           | 235/379 |
| 7,706,510 | B2 |   | 4/2010  | Ng                        |           |
| 7,925,708 | B2 |   | 4/2011  | Davis et al.              |           |
| 8,385,962 | B1 | * | 2/2013  | Gailloux ................. | H04W 4/10 |
|           |    |   |         |                           | 455/518 |

(Continued)

FOREIGN PATENT DOCUMENTS

CN          103516582 A        1/2014

OTHER PUBLICATIONS

PCT Search Report and Written Opinion dated Aug. 18, 2016 for PCT Application No. PCT/US16/32217, 6 pages.

(Continued)

*Primary Examiner* — Hamza N Algibhah
*Assistant Examiner* — Hannah S Wang
(74) *Attorney, Agent, or Firm* — Lee & Hayes, P.C.

(57) ABSTRACT

An instant communication method is disclosed. The method includes receiving an instant communication message sent by a first client terminal, the instant communication message including first identity information and second identity information; obtaining a corresponding self-defined voice message based on the first identity information; adding the instant communication message to the end of the self-defined voice message to form a current message; and sending the current message to a communication device that corresponds to the second identity information. The instant communication method is able to effectively avoid misunderstanding of a message receiving party.

20 Claims, 5 Drawing Sheets

(56) References Cited

U.S. PATENT DOCUMENTS

| | | | | |
|---|---|---|---|---|
| 10,171,908 B1* | 1/2019 | Sinkov | | H04R 3/005 |
| 2001/0040886 A1* | 11/2001 | Jimenez | | H04L 29/06 |
| | | | | 370/352 |
| 2002/0191757 A1* | 12/2002 | Belrose | | G09B 21/006 |
| | | | | 379/88.13 |
| 2003/0177010 A1* | 9/2003 | Locke | | G10L 13/00 |
| | | | | 704/260 |
| 2005/0136955 A1* | 6/2005 | Mumick | | H04L 51/38 |
| | | | | 455/466 |
| 2006/0182245 A1 | 8/2006 | Steinmetz | | |
| 2007/0003028 A1* | 1/2007 | Korah | | H04M 3/53383 |
| | | | | 379/88.14 |
| 2008/0045199 A1* | 2/2008 | Lee | | G10L 13/00 |
| | | | | 455/414.4 |
| 2008/0268817 A1* | 10/2008 | Anderl | | H04M 1/7255 |
| | | | | 455/412.2 |
| 2009/0086720 A1 | 4/2009 | Westlake | | |
| 2009/0131090 A1 | 5/2009 | Jo et al. | | |
| 2010/0205539 A1 | 8/2010 | Gestsson et al. | | |
| 2011/0021178 A1* | 1/2011 | Balasaygun | | G10L 17/26 |
| | | | | 455/413 |
| 2011/0289174 A1 | 11/2011 | Malik | | |
| 2012/0271732 A1* | 10/2012 | Glass | | G06Q 30/0621 |
| | | | | 705/26.5 |
| 2015/0095034 A1* | 4/2015 | Acker | | G10L 13/02 |
| | | | | 704/260 |
| 2015/0181031 A1* | 6/2015 | Warnack | | H04M 3/42059 |
| | | | | 370/259 |
| 2015/0255111 A1* | 9/2015 | Grasso | | G06F 21/10 |
| | | | | 700/94 |
| 2015/0268926 A1* | 9/2015 | Panaiotis | | G06F 3/167 |
| | | | | 715/716 |
| 2016/0321263 A1* | 11/2016 | Madiraju | | G06F 16/2457 |
| 2017/0315776 A1* | 11/2017 | Grasso, Jr. | | H04R 1/028 |
| 2018/0109681 A1* | 4/2018 | Mclean, Jr. | | H04M 1/6505 |

OTHER PUBLICATIONS

English-language translation of First Office Action dated Feb. 3, 2019 by The State Intellectual Property Office of the People's Republic of China in corresponding Application No. 201510245851 (10 pages).

First Office Action dated Feb. 3, 2019 by The State Intellectual Property Office of the People's Republic of China in corresponding Application No. 201510245851 (7 pages).

\* cited by examiner

INSTANT COMMUNICATION METHOD AND SERVER

CROSS REFERENCE TO RELATED PATENT APPLICATION

This application claims foreign priority to Chinese Patent Application No. 201510245851.7 filed on May 14, 2015, entitled "Instant Communication Method and Server", which is hereby incorporated by reference in its entirety.

TECHNICAL FIELD

The present disclosure relates to the field of communications, and more particularly, to instant communication methods and servers.

BACKGROUND

Text To Speech (TTS) is a technology that can convert a text into a voice, and can convert files, web pages, text messages or the like into voice for output.

Currently, the TTS technology has been applied to the fields of traditional telephony communications and Internet communications. For example, the TTS technology can be used in matters of regular audio broadcasting. When a modification is needed, only an associated text needs to be modified, and no complicated operations such as re-recording are needed to be performed.

The voice used in the TTS technology is relatively standard, and achieves a relatively standardized user experience. However, as society develops, some unscrupulous persons take advantage of the acceptance of the TTS technology among people and use the TTS technology to broadcast fake messages, such as fake calling, in order to defraud people of money or belongings. This causes people to become more sensitive. When a person receives a phone call or voice message that is broadcast using a TTS voice, he/she may consider it as a false message and directly hang up or stop listening. Because existing communication systems or network systems cannot effectively distinguish fake messages from non-fake messages, voice communication or voice messages that use the TTS technology may be rejected or may not receive any responses because they are mistaken as false messages by receiving parties.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of embodiments of the present disclosure is to provide an instant communication method and a server thereof, which can effectively avoid misunderstanding of a message receiving party.

To solve the above technical problem, the present disclosure provides an instant communication method, which may include receiving an instant communication message sent by a first client terminal, the instant communication message including first identity information and second identity information; obtaining a corresponding self-defined voice message according to the first identity information; combining the instant communication message with the self-defined voice message to form a current message; and sending the current message to a communication device that corresponds to the second identity information.

The present disclosure further provides a server, which may include a receiving module used for receiving an instant communication message sent by a first client terminal, the instant communication message including first identity information and second identity information; an acquisition module used for obtaining a corresponding self-defined voice message according to the first identity information; a combination module used for combining the instant communication message with the self-defined voice message to form a current message; and a sending module used for sending the current message to a communication device that corresponds to the second identity information.

As can be seen from the above technical solutions provided by the embodiments of the present disclosure, the present disclosure combines an instant communication message sent by a first client terminal with a self-defined voice message to form a current message in a process of instant communication, and sends the current message to a communication device that corresponds to second identity information. Upon receiving the current message, a message receiving party hears the self-defined voice message that matches an identity of a message sending party first, and therefore can accurately identify the identity of the message sending party. As such, the present disclosure can effectively avoid the message receiving party from mistakenly considering the message as a fake message, and thereby improve a success rate of communications.

BRIEF DESCRIPTION OF THE DRAWINGS

In order to describe technical solutions in embodiments of the present disclosure or existing technologies in a clearer manner, drawings that are used in the embodiments or the existing technologies are briefly described herein. Apparently, the described drawings merely represent some of the embodiments of the present disclosure. One of ordinary skill in the art may further obtain other drawings based on these drawings without making any creative effort.

DETAILED DESCRIPTION OF EMBODIMENTS

In order to facilitate one skilled in the art to understand the technical solutions of the present disclosure in a better manner, the technical solutions in the embodiments of the present disclosure are clearly and comprehensively described herein with reference to the accompanying drawings in the embodiments of the present disclosure. Apparently, the described embodiments merely represent a portion and not all of the embodiments of the present disclosure. All other embodiments that are obtained by one of ordinary skill in the art based on the embodiments of the present disclosure and without making any creative effort shall fall within the scope of protection of the present disclosure.

Figure 1:
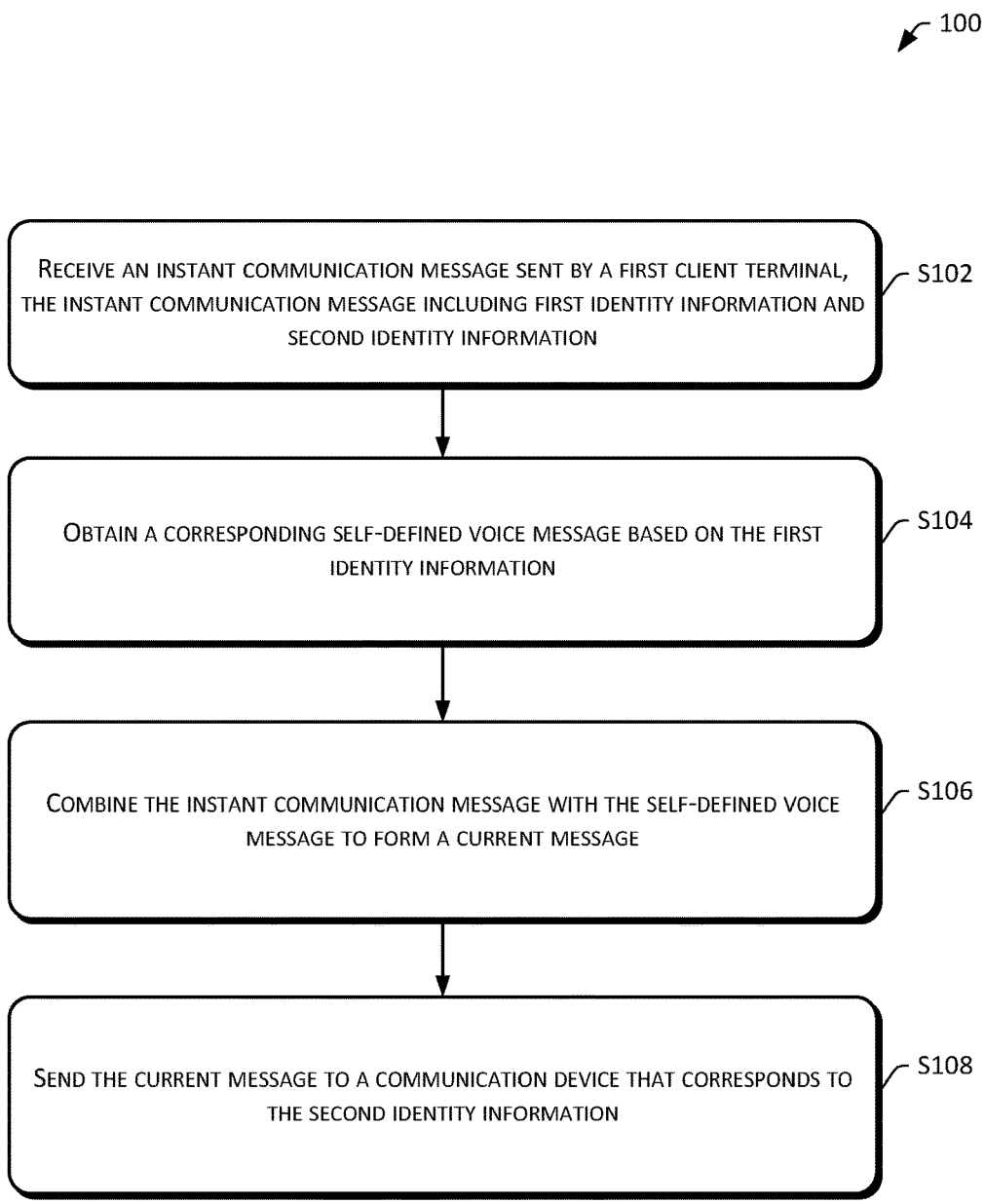
FIG. 1 is a flowchart of an instant communication method according to an embodiment of the present disclosure.

FIG. 1 provides an instant communication method 100 according to the embodiments of the present disclosure, which may include the following method blocks.

S102 receives an instant communication message sent by a first client terminal, the instant communication message including first identity information and second identity information.

In implementations, the first client terminal may include a communication device having a network communication function, such as a smart phone, a tablet computer, a desktop computer, a notebook computer or a smart wearable device, etc. Apparently, the first client terminal may alternatively include software that runs in any of the foregoing communication devices. The first client terminal may be used by a user to send an instant communication message.

In implementations, client terminals can communicate with each other, that is, send instant communication messages to each other. In implementations, an instant communication message may include a text, a voice, an image, a file, etc.

In implementations, identity information may be used to identify a client terminal, so that client terminals are able to recognize and distinguish each other based on identity information during a communication process. In implementations, when a first client terminal and a second client terminal conduct instant communications, a session may be set up, and a session identifier may be created. First identity information that identifies the first client terminal and second identity information that identifies the second client terminal are set to correspond to the session identifier. In this way, during a process of interaction and communication between the first client terminal and the second client terminal, an instant communication server is able to distinguish a sending party and a receiving party of a current instant communication message based on the first identity information and the second identity information. In addition, a client terminal that acts as the receiving party can find the corresponding session identifier according to identity information included in an instant communication message, and then determine to present a session of the current instant communication message.

In implementations, including the first identity information and the second identity information in the instant communication message may include the first identity information and the second identity information being carried as a portion of content of the instant communication message; or the first identity information and the second identity information being carried as an attachment to the instant communication message; or one of the first identity information and the second identity information being carried as an attachment to the instant communication message and the other being carried as a portion of content of the instant communication message.

S104 obtains a corresponding self-defined voice message based on the first identity information.

In implementations, the self-defined voice message can accurately identify an identity of the message sending party for the message receiving party. The self-defined voice message may be a piece of personalized voice/audio, which is recorded by the first client terminal and correspondingly stored in an instant communication server. For example, "This is A. I send you the following message. Please reply as soon as possible."

In implementations, the self-defined voice message may be generated by means of recording, or may be generated in other manners, provided that the message receiving party is able to accurately identify the identity of the message sending party upon receiving the self-defined voice message, and will not consider the received message as a fake message and hang up or directly ignore it without further response. One skilled in the art may also make other modifications under the teachings of technical essences of the present disclosure, and such modifications shall all fall within the scope of protection of the present disclosure as long as same or similar function(s) and effect(s) as those in the present disclosure are achieved.

In implementations, in terms of storage, the self-defined voice message may be stored in correspondence with the first identity information in an instant communication server, so that the self-defined voice message can be obtained by searching the server according to the first identity information when the self-defined voice message needs to be obtained. In implementations, a data table may be set, for example, where a first column of data in the data table includes first identity information, and a second column of data includes storage paths of corresponding self-defined voice information. In this way, a storage path of the corresponding self-defined voice information can be obtained by searching the data table for the first identity information.

S106 combines the instant communication message with the self-defined voice message to form a current message.

In implementations, the instant communication server obtains a corresponding location in which the self-defined voice message is stored by finding the first identity information of the first client terminal. The instant communication server may then obtain the self-defined voice message, and combines the instant communication message sent by the first client terminal with the self-defined voice message to form a current message, where the instant communication message may be placed after the end of the self-defined voice message. In implementations, the instant communication message may include, for example, a text message. In this case, the TTS technology may be used to convert the instant communication message into a voice message, and the voice message is then combined with the self-defined voice message. Alternatively, the instant communication message may be a voice message, and the instant communication message can be directly added to the end of the self-defined voice message. For another example, content corresponding to the instant communication message may include an image. In this case, a text in the image can be first recognized using an image recognition technology. The text is converted into a voice message using the TTS technology, and the voice message is then combined with the self-defined voice message. If the content corresponding to the instant communication message includes a file, content of the file can be converted into a voice message using the TTS technology, and the voice message is then combined with the self-defined voice message.

S108 sends the current message to a communication device that corresponds to the second identity information.

In implementations, the communication device may be a communication device having a network communication function, for example, a smart phone, a tablet computer or a smart wearable device, etc. The communication device may be used by a user to receive the current message.

In implementations, second identity information is used to identify a communication device corresponding thereto. In implementations, when a first client terminal and a second client terminal conduct instant communications, a session is set up, and a session identifier is created. First identity information that identifies the first client terminal and second identity information that identifies the second client terminal are set to correspond to the session identifier. In this way, during a process of interaction and communications between the first client terminal and the second client terminal, the instant communication server is able to distinguish a sending party and a receiving party of a current instant communication message based on the first identity information and the second identity information. After forming the current message, the instant communication server can accurately send the current message to a communication device that corresponds to the second identity information.

During a process of instant communications, the example instant communication method adds an instant communication message received from a first client terminal to the end of a self-defined voice message to form a current message, and sends the current message to a communication device that corresponds to second identity information. Upon receiving the current message, a message receiving party will first hear the self-defined voice message that matches an identity of a message sending party, and therefore can accurately identify the identity of the message sending party. Thereby, the present disclosure can effectively avoid the misunderstanding of the message receiving party and improve a success rate of communications.

Figure 2:
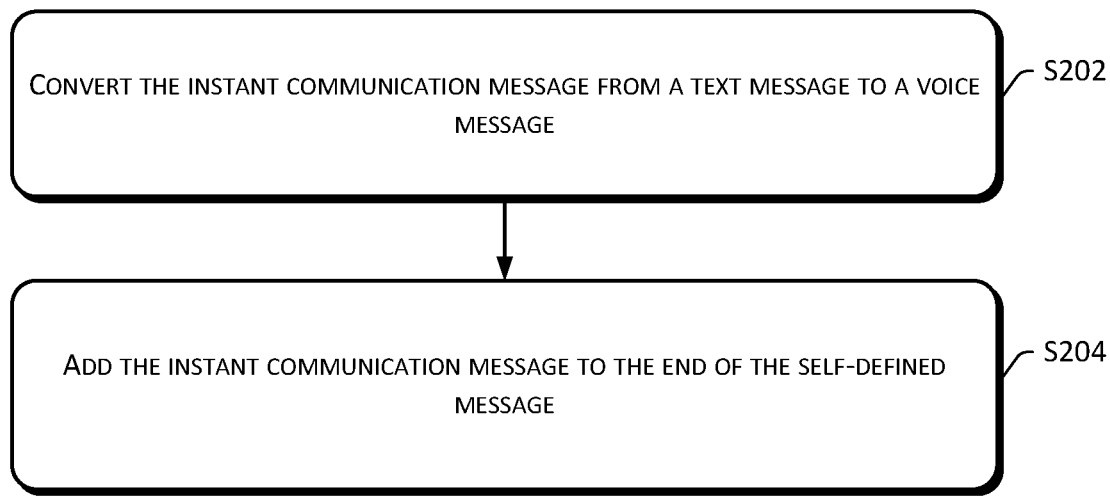
FIG. 2 is a flowchart of an instant communication method according to an embodiment of the present disclosure.

Referring to FIG. 2 shows an exemplary embodiment of the present disclosure that the instant communication message is a text message. The method block S106 may include the following method blocks.

S202 converts the instant communication message from a text message to a voice message.

S204 adds the instant communication message to the end of the self-defined message.

In implementations, when the instant communication message is a text message, format conversion may be performed first, that is, the text message is converted into a voice message. The messages may then be combined. In implementations, the text message may be converted into a voice message using the TTS technology, for example, and the voice message is then combined with the self-defined voice message.

Figure 3:
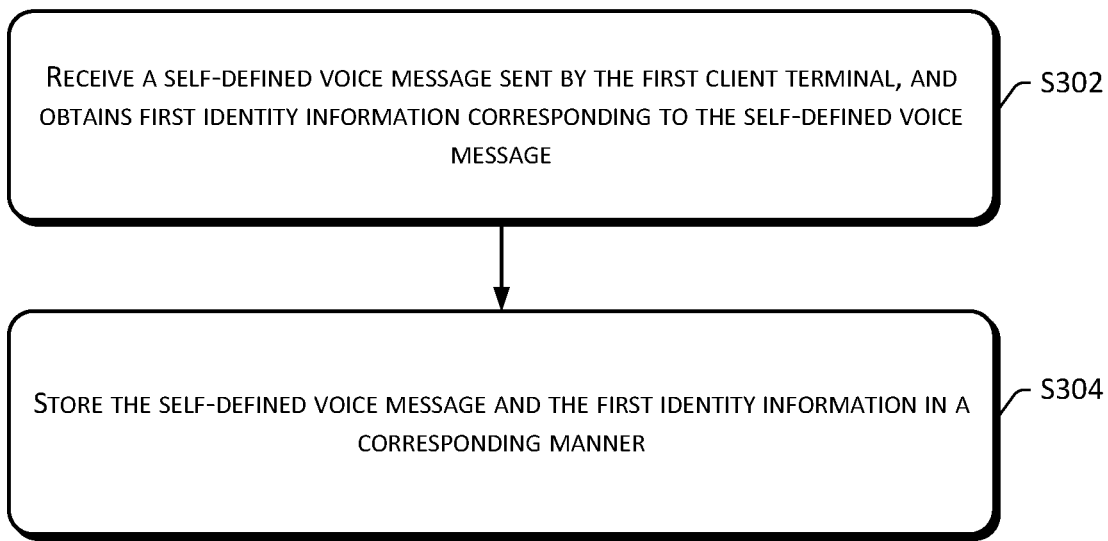
FIG. 3 is a flowchart of an instant communication method according to an embodiment of the present disclosure.

In implementations, the method 100 may further include the following method blocks as shown in FIG. 3.

S302 receives a self-defined voice message sent by the first client terminal, and obtains first identity information corresponding to the self-defined voice message.

S304 stores the self-defined voice message and the first identity information in a corresponding manner.

In implementations, the self-defined voice message may be set up by uploading to a server. For example, a user may locally record a self-defined voice message in advance, and upload the self-defined voice message to a server, thereby achieving a setup of the self-defined voice message.

In implementations, a method of obtaining the first identity information may include including the first identity information in the self-defined voice message, so that the first identity information can be obtained once the self-defined voice message is received. Additionally or alternatively, the method of obtaining the first identity information may include enabling an entry of the first identity information via an interface for uploading the self-defined voice message, so that the self-defined voice message can be stored in correspondence with the first identity information when being uploaded. In implementations, respective storage paths of the first identity information and the self-defined voice message may be recorded in a form of a data table, so that the self-defined voice information can further be obtained based on the first identity information.

In implementations, in terms of storage, the self-defined voice message may be stored in correspondence with the first identity information in an instant communication server, so that the self-defined voice message can be obtained by searching the server based on the first identity information when the self-defined voice message needs to be obtained.

Figure 4:
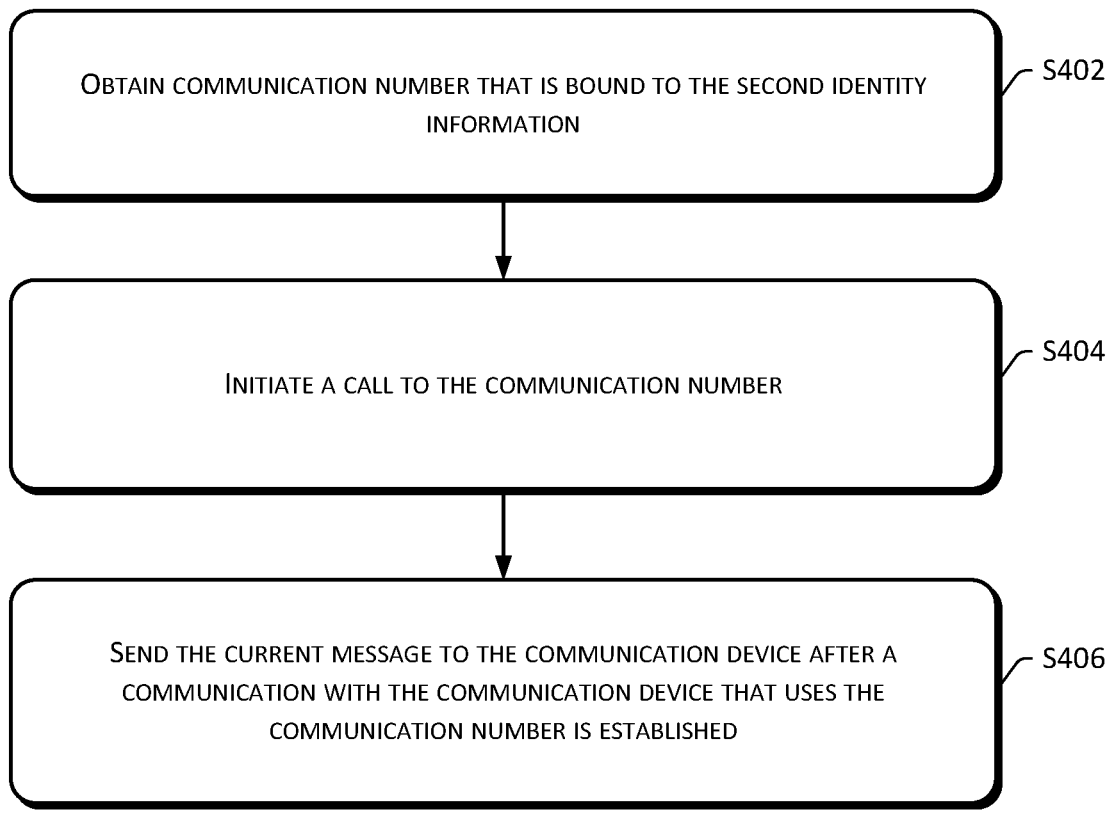
FIG. 4 is a flowchart of an instant communication method according to an embodiment of the present disclosure.

Referring to FIG. 4, in implementations, sending the current message to the communication device at S108 may include:

S402: A communication number that is bound to the second identity information is obtained.

S404: A call to the communication number is initiated.

S406: The current message is sent to the communication device after a communication with the communication device that uses the communication number is established.

In implementations, a communication device may have a communication number that is provided by a telecommunication operator. When a call to the communication number is initiated, a communication can be established with the communication device via a server of the telecommunication operator, thereby conducting a telephony communication.

In implementations, personal information may be set for a user that corresponds to the second identity information. The personal information may include a communication number of the user. Since the second identity information identifies the user, a binding relationship between the second identity information and the communication number may exist. In other words, the communication number can be obtained when the second identity information is known.

In implementations, a call to the communication number is initiated. If the communication device accepts the call, a communication is established. The current message is sent to the communication device based on the established communication. In implementations, after the communication is established, the current message needs to be encoded according to an encoding scheme that is stipulated by a communication protocol, and sent to the communication device. After receiving the current message, the communication device decodes the current message according to a decoding scheme that is stipulated by the communication protocol, and plays the current message.

Figure 5:
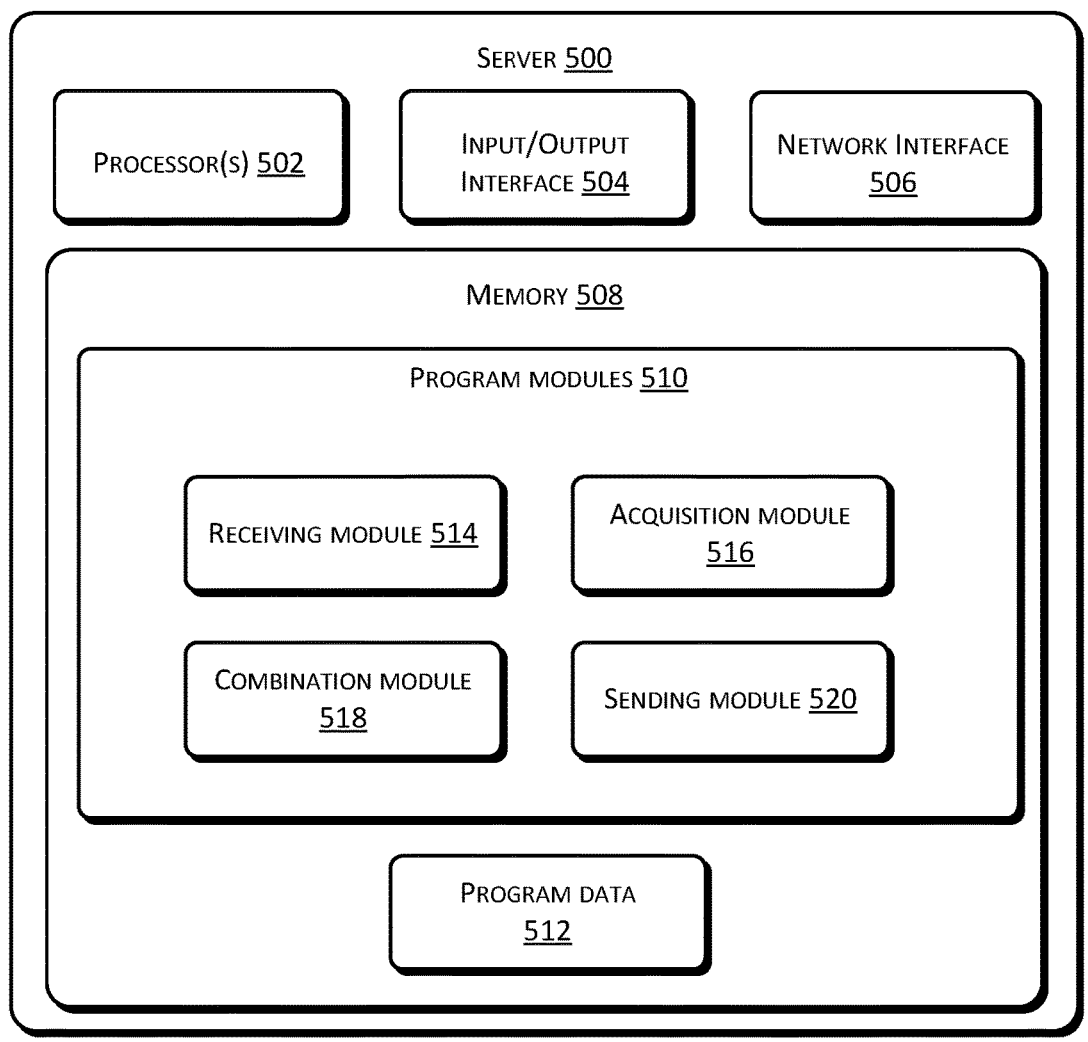
FIG. 5 is a schematic diagram of a server according to an embodiment of the present disclosure.

Referring to FIG. 5, the embodiments of the present disclosure further provide a server 500. In implementations, the server 500 may include one or more computing devices. By way of example and not limitation, the server 500 may include one or more processors 502, an input/output (I/O) interface 504, a network interface 506 and memory 508.

The memory 508 may include a form of computer-readable media, e.g., a non-permanent storage device, random-access memory (RAM) and/or a nonvolatile internal storage, such as read-only memory (ROM) or flash RAM. The memory 508 is an example of computer-readable media.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the memory 508 may include program modules 510 and program data 512. The program modules 510 may include a receiving module 514, an acquisition module 516, a combination module 518 and a sending module 520.

The receiving module 514 receives an instant communication message sent by a first client terminal, the instant communication message including first identity information and second identity information.

In implementations, the first client terminal may include a communication device having a network communication function, for example, a smart phone, a tablet computer, a desktop computer, a notebook computer or a smart wearable device, etc. Apparently, the first client terminal may alternatively be software that runs in any of the above communication devices. The first client terminal can be used by a user to send an instant communication message.

In implementations, client terminals can communicate with each other, that is, send instant communication messages to each other. In implementations, an instant communication message may include a text, a voice, an images, a file, etc.

In implementations, identity information may be used to identify a client terminal, so that client terminals are able to recognize and distinguish each other based on identity information during a communication process. In implementations, when a first client terminal and a second client terminal conduct instant communications, a session may be set up, and a session identifier may be created. First identity information that identifies the first client terminal and second identity information that identifies the second client terminal are set to correspond to the session identifier. In this way, during a process of interaction and communication between the first client terminal and the second client terminal, an instant communication server is able to distinguish a sending party and a receiving party of a current instant communication message based on the first identity information and the second identity information. In addition, a client terminal that acts as the receiving party can find the corresponding session identifier according to identity information carried in an instant communication message, and then determine to present a session of the current instant communication message.

In implementations, including the first identity information and the second identity information in the instant communication message may include the first identity information and the second identity information being carried as a portion of content of the instant communication message; or the first identity information and the second identity information being carried as an attachment to the instant communication message; or one of the first identity information and the second identity information being carried as an attachment to the instant communication message and the other being carried as a portion of content of the instant communication message.

The acquisition module 516 obtains a corresponding self-defined voice message based on the first identity information.

In implementations, the self-defined voice message can accurately identify an identity of the message sending party for the message receiving party. The self-defined voice message may be a piece of personalized voice/audio, which is recorded by the first client terminal and correspondingly stored in an instant communication server. For example, "This is XX. I send you the following message. Please reply as soon as possible."

In implementations, the self-defined voice message may be generated by means of recording, or may be generated in other manners, provided that the message receiving party is able to accurately identify the identity of the message sending party upon receiving the self-defined voice message, and will not consider the received message as a fake message and hang up or directly ignore it without further response.

In implementations, in terms of storage, the self-defined voice message may be stored in correspondence with the first identity information in an instant communication server, so that the self-defined voice message can be obtained by searching the server according to the first identity information when the self-defined voice message needs to be obtained. In implementations, a data table may be set, for example, where a first column of data in the data table includes first identity information, and a second column of data includes storage paths of corresponding self-defined voice information. In this way, a storage path of the corresponding self-defined voice information can be obtained by searching the data table for the first identity information.

The combination module 518 combines the instant communication message with the self-defined voice message to form a current message.

In implementations, the instant communication server obtains a corresponding location in which the self-defined voice message is stored by finding the first identity information of the first client terminal. The instant communication server may then obtain the self-defined voice message, and combines the instant communication message sent by the first client terminal with the self-defined voice message to form a current message, where the instant communication message may be placed after the end of the self-defined voice message. In implementations, the instant communication message may include, for example, a text message. In this case, the TTS technology may be used to convert the instant communication message into a voice message, and the voice message is then combined with the self-defined voice message. Alternatively, the instant communication message may be a voice message, and the instant communication message can be directly added to the end of the self-defined voice message. For another example, content corresponding to the instant communication message may include an image. In this case, a text in the image can be first recognized using an image recognition technology. The text is converted into a voice message using the TTS technology, and the voice message is then combined with the self-defined voice message. If the content corresponding to the instant communication message includes a file, content of the file can be converted into a voice message using the TTS technology, and the voice message is then combined with the self-defined voice message.

The sending module 520 sends the current message to a communication device that corresponds to the second identity information.

In implementations, the communication device may be a communication device having a network communication function, for example, a smart phone, a tablet computer or a smart wearable device, etc. The communication device may be used by a user to receive the current message. Apparently, the first client terminal may alternatively be software that runs in the above communication device.

There may be one or more communication devices. The communication device can be used by a user to receive the current message.

In implementations, the second identity information is used to identify a communication device corresponding thereto.

In implementations, when a first client terminal and a second client terminal conduct instant communications, a session is set up, and a session identifier is created. First identity information that identifies the first client terminal and second identity information that identifies the second client terminal are set to correspond to the session identifier. In this way, during a process of interaction and communications between the first client terminal and the second client terminal, the instant communication server is able to distinguish a sending party and a receiving party of a current instant communication message based on the first identity information and the second identity information. After forming the current message, the instant communication server can accurately send the current message to a communication device that corresponds to the second identity information.

It can be seen from the above technical solutions provided by the embodiments of the present disclosure, the example instant communication server adds an instant communication message received from a first client terminal to the end of a self-defined voice message to form a current message, and sends the current message to a communication device that corresponds to second identity information during a process of instant communications. Upon receiving the current message, a message receiving party will first hear the self-defined voice message that matches an identity of a message sending party, and therefore can accurately identify the identity of the message sending party. Thereby, the present disclosure can effectively avoid the misunderstanding of the message receiving party and improve a success rate of communications.

Multiple embodiments of the present disclosure have been described in the present disclosure. One skilled in the art should understand that the embodiments of the present disclosure can be combined with one another. In addition, one skilled in the art should know that various modifications and variations can be made to the present disclosure without departing from the spirit of the present disclosure, and it is intended that the appended claims cover these modifications and variations without departing from the spirit of the present disclosure.

What is claimed is:

1. A method implemented by a server, comprising:
   receiving an instant communication message sent by a first client terminal, the instant communication message including message content, first identity information and second identity information;
   obtaining a self-defined voice message stored on the server based at least in part on the first identity information, the self-defined voice message comprising at least part of the first identity information in voice form;
   converting the message content into a corresponding voice message;
   combining the corresponding voice message with the self-defined voice message to form a combined message; and
   sending the combined message to a second client terminal that corresponds to the second identity information.

2. The method of claim 1, wherein the message content of the instant communication message comprises a text message, converting the message content into a corresponding voice message comprises converting the text message into a corresponding voice message, and combining the corresponding voice message with the self-defined voice message comprises
   adding the corresponding voice message to an end of the self-defined message.

3. The method of claim 1, wherein the message content of the instant communication message comprises an electronic file attached to the instant communication message, converting the message content into a corresponding voice message comprises converting content of the electronic file into a corresponding voice message, and combining the corresponding voice message with the self-defined voice message comprises
   adding the corresponding voice message to an end of the self-defined message.

4. The method of claim 1, further comprising:
   receiving the self-defined voice message from the first client terminal;
   obtaining the first identity information corresponding to the self-defined voice message; and
   correspondingly storing the self-defined voice message and the first identity information.

5. The method of claim 1, wherein sending the combined message comprises:
   obtaining a communication number associated with the second identity information;
   initiating a call to the communication number;
   sending the combined message to the second client terminal after a communication with the second client terminal is established.

6. The method of claim 1, further comprising correspondingly storing the self-defined voice message and the first identity information identifying the sending client terminal.

7. The method of claim 1, wherein obtaining the self-defined voice message comprises obtaining a corresponding location or storage path of the self-defined voice message based on the first identity information identifying the sending client terminal.

8. One or more computer-readable media storing executable instructions that, when executed by one or more processors of a server, cause the one or more processors to perform acts comprising:
   receiving an instant communication message sent by a first client terminal, the instant communication message including message content, first identity information and second identity information;
   obtaining a self-defined voice message stored on the server based at least in part on the first identity information the self-defined voice message comprising at least part of the first identity information in voice form;
   converting the message content into a corresponding voice message;
   combining the corresponding voice message with the self-defined voice message to form a combined message; and
   sending the combined message to a second client terminal that corresponds to the second identity information.

9. The one or more computer-readable media of claim 8, wherein the message content of the instant communication message comprises a text message, converting the message content into a corresponding voice message comprises converting the text message into a corresponding voice message, and combining the corresponding voice message with the self-defined voice message comprises
   adding the corresponding voice message to an end of the self-defined message.

10. The one or more computer-readable media of claim 8, wherein the message content of the instant communication message comprises an electronic file attached to the instant communication message, converting the message content into a corresponding voice message comprises converting content of the electronic file into a corresponding voice message, and combining the corresponding voice message with the self-defined voice message comprises adding the corresponding voice message to an end of the self-defined message.

11. The one or more computer-readable media of claim 8, the acts further comprising:

receiving the self-defined voice message from the first client terminal;

obtaining the first identity information corresponding to the self-defined voice message; and correspondingly storing the self-defined voice message and the first identity information.

12. The one or more computer-readable media of claim 8, wherein sending the current message comprises:

obtaining a communication number that is bound to the second identity information;

initiating a call to the communication number;

sending the current message to the second client terminal after a communication with the second client terminal that uses the communication number is established.

13. The one or more computer-readable media of claim 8, the acts further comprising correspondingly storing the self-defined voice message and the first identity information.

14. The one or more computer-readable media of claim 8, wherein obtaining the self-defined voice message comprises obtaining a corresponding location or storage path of the self-defined voice message based on the first identity information.

15. A server comprising:

one or more processors;

memory;

a receiving module stored in the memory and executable by the one or more processors to receive an instant communication message sent by a first client terminal, the instant communication message including message content, first identity information and second identity information;

an acquisition module stored in the memory and executable by the one or more processors to obtain a corresponding self-defined voice message stored on the server according to the first identity information, the self-defined voice message comprising at least part of the first identity information in voice form;

a combination module stored in the memory and executable by the one or more processors to convert the message content into a corresponding voice message and combine the corresponding voice message with the self-defined voice message to form a combined message; and a sending module stored in the memory and executable by the one or more processors to send the combined message to a second client terminal that corresponds to the second identity information.

16. The server of claim 15, wherein the message content of the instant communication message comprises a text message, and the combination module converts the message content into a corresponding voice message by converting the text message into a corresponding voice message, and combines the corresponding voice message with the self-defined voice message by adding the corresponding voice message to an end of the self-defined message.

17. The server of claim 15, wherein the message content of the instant communication message comprises an electronic file attached to the instant communication message, and the combination module converts the message content into a corresponding voice message by converting content of the electronic file into a corresponding voice message, and combines the corresponding voice message with the self-defined voice message by adding the corresponding voice message to an end of the self-defined message.

18. The server of claim 15, wherein the sending module sends the current message by:

obtaining a communication number that is bound to the second identity information;

initiating a call to the communication number;

sending the combined message to the second client terminal after a communication with the second client terminal is established.

19. The server of claim 15, wherein the acquisition module obtains the self-defined voice message by obtaining a corresponding location or storage path of the self-defined voice message based on the first identity information.

20. The server of claim 15, wherein the self-defined voice message and the first identity information are correspondingly stored together.

* * * * *